United States Patent Office 3,766,227
Patented Oct. 16, 1973

3,766,227
HYDROLYSIS-RESISTANT ACETOGLYCERIDES
WHICH ARE SOLID AT ROOM TEMPERATURE
Heinrich Bünger, Witten-Bommern, and Gustav Renckhoff, Witten (Ruhr), Germany, assignors to Dynamit Nobel Aktiengesellschaft, Troisdorf, Germany
No Drawing. Filed Mar. 24, 1971, Ser. No. 127,809
Claims priority, application Germany, Mar. 28, 1970, P 20 15 085.0
Int. Cl. C07c 69/30; C11c 3/00
U.S. Cl. 260—410.8                    8 Claims

ABSTRACT OF THE DISCLOSURE

Completely odorless acetoglycerides, solid at room temperature and having an extraordinary resistance to hydrolysis, are prepared by acetylating partial glycerides of fatty acids having 16 and/or 18 carbon atoms, the partial glycerides having an iodine number of below 5 and a monoglyceride content of more than 70% by weight, to a hydroxyl number of at most 30, distilling off the acetic acid and excess acetic anhydride as completely as possible, and deodorizing the reaction mixture at a temperature of greater than 170° C. under a vacuum, with an inert gas or vapor being passed therethrough.

BACKGROUND OF THE INVENTION

This invention relates to acetoglycerides. More particularly, it relates to a process for the preparation of extraordinarily hydrolysis-resistant acetoglycerides which are solid at room temperature.

Acetoglycerides are esters of glycerin containing, in addition to at least one longer alkanoyl group, at least one acetyl group. These compounds exhibit additional useful properties as compared to the other known glycerides. For example, they are rather oxidation-resistant at a relatively low melting point. When the melting point is suitably selected, they can be employed for the production of flexible coatings, the food industry making use of this fact to a large extent. Provided with such coatings, the foodstuffs are protected against moisture loss and oxidation.

Further useful applications for acetoglycerides are in the fields of pharmaceuticals and cosmetics. In these fields, such products are employed, for example, as emulsifiers or as agents to improve the consistency of the formulations.

In all of these applications, the speed with which the acetoglycerides are hydrolyzed is of special importance. In fact, even a minor hydrolysis causes a troublesome acetic acid odor. Furthermore, intolerable disturbances can be produced in emulsifier systems in this connection, because of the change in pH.

Solid acetoglycerides produced in accordance with the state of the art known heretofore hydrolyze to a marked extent, and they do this more rapidly than other glycerides [Feuge et al., The Journal of the American Oil Chemists' Society, 30, pp. 286–7 (1953)]. Accordingly, the use of acetoglycerides under stronger hydrolytic conditions is said to be inadvisable (note, for example, the company leaflet of the Distillation Products Industries, Division of Eastman Kodak Company, Rochester, N.Y., Product Bulletin A8, of Feb. 14, 1964).

Accordingly, one of the objects of the present invention is to provide hydrolysis-resistant acetoglycerides which are solid at room temperature.

Another object of the invention is to provide a process for the preparation of extraordinarily hydrolysis-resistant acetoglycerides solid at room temperature which may be carried out in an efficacious and advantageous manner.

These and other objects and advantages of the present invention will become apparent to those skilled in the art from a consideration of the following specification and claims.

SUMMARY OF THE INVENTION

In accordance with the present invention, it has been surprisingly and unexpectedly found that acetoglycerides which are substantially more resistant to hydrolysis and which are solid at room temperature can be obtained by acetylating, in a conventional manner, suitable partial glycerides or partial glyceride mixtures with acetic anhydride at temperatures of above 60° C. to maximum hydroxyl number of 30, distilling off as completely as possible the acetic acid and excess acetic anhydride, and thereafter deodorizing the reaction product at temperatures of more than 170° C. under vacuum and passing nitrogen, steam or another inert gas through the reaction product.

The acetoglycerides obtained in accordance with this invention, which exhibit hydroxyl numbers of 30 or less, do not develop any odor of acetic acid or fatty acid when stored in moist air, nor do they hydrolyze to a marked extent in contact with water or with dilute mineral acids. This is the more surprising, since it is set forth, in the above-mentioned paper by Feuge et al., that acetoglycerides having a hydroxyl number of 33 hydrolyze more rapidly than those having an increased hydroxyl number.

EXAMPLES OF THE INVENTION

The following examples are given merely as illustrative of the present invention and are not to be considered as limiting.

Example 1

50 kg. of a molecular-distilled fraction of glycerides of palmitic and stearic acid, containing about 90% by weight of monoglycerides and having an iodine number of below 5, is heated to 80° C. and is then acetylated with 33.8 kg. of acetic anhydride. During this step, the reaction mixture is cooled so that the reaction temperature does not rise above 120° C. After termination of the reaction, the thus-produced acetic acid and the unreacted acetic anhydride are distilled off at 110–140° C., this being conducted toward the end under vacuum. Then, the reaction mixture is deodorized for three hours under vacuum at 190° C. by introducing steam thereto. A completely odorless, solid acetoglyceride is obtained having the following characteristic data:

| | |
|---|---|
| Acid number | Below 1 |
| Saponification number | 377 |
| Hydroxyl number | 1 |
| Ascending melting point, ° C. | 31 |

This acetoglyceride is still completely odorless even after two years of storage in air.

10 grams of the thus-produced acetoglyceride is heated with 10 ml. of 1 N hydrochloric acid for 15 hours to 80° C. Thereafter, the reaction mixture is titrated to the neutral point with a 1 N solution of sodium hydroxide. The consumption of measuring solution is 10.0 ml.

Example 2

50 kg. of the same glyceride fraction as in Example 1 is reacted at 80–120° C. with 25.1 kg. of acetic anhydride and worked up as described in Example 1. A completely odorless, solid acetoglyceride is obtained having a hydroxyl number of 30, which likewise remains odorless even after being stored for two years in air.

10 grams of the thus-prepared acetoglyceride is treated, as described in Example 1, with 10.0 ml. of 1 N hydrochloric acid. Here again, 10.0 ml. of a 1 N sodium hydroxide solution is required for neutralization.

Example 3

50 kg. of a fraction of glycerides of palmitic and stearic acid, containing about 70% by weight of monoglycerides and having an iodine number of below 5, is acetylated and worked up as indicated in Example 1. 10 grams of the solid reaction product, having a hydroxyl number of 1, is heated, as described in Example 2, with 10.0 ml. of 1 N hydrochloric acid for 15 hours to 80° C. Thereafter, the reaction mixture is titrated to the neutral point, consuming 10.0 ml. of 1 N sodium hydroxide solution for this purpose.

COMPARATIVE EXAMPLE

This example is given merely for comparison of the present invention with representative prior art.

A commercially availabe acetoglyceride having an acid number of below 1, a saponification number of 292, a hydroxyl number of 121 and an ascending melting point of 39° C., is stored in air for two years. After that time, the acetoglyceride has an intensive vinegar (acetic acid) odor.

10 grams of the same commercial acetoglyceride is heated with 10 ml. of 1 N hydrochloric acid for 15 hours to 80° C. Then, the mixture is titrated with 1 N sodium hydroxide solution to the neutral point, wherein 20.5 ml. of measuring solution is consumed.

The present invention is applicable to the partial glycerides of fatty acids having 16 and/or 18 carbon atoms, resulting in completely odorless acetoglycerides which are solid at room temperature and which exhibit an extraordinary resistance to hydrolysis. The starting materials have an iodine number of below 5 and a monoglyceride content of more than 70% by weight. An essential feature of the invention is that these starting compounds are acetylated to a hydroxyl number of maximally 30, the acetic acid and the excess acetic anhydride being distilled off as completely as possible, and the reaction mixture then being deodorized at temperatures of more than 170° C. under a vacuum while passing an inert gas or vapor therethrough. The acetylation step is suitably conducted at a temperature of about 60° to 150° C., and the deodorizing step is suitably carried out at a temperature of from about 170° C. to 220° C. It is further to be understood that the inert gas and/or the steam or vapor is passed preferably from below through the reaction product while the vacuum is still being applied. Consequently, an azeotropic steam distillation, for example, under vacuum is involved in this procedure.

The invention being thus described, it will be obvious that the same may be varied in many ways. Such variations are not to be regarded as a departure from the spirit and scope of this invention, and all such modifications as would be obvious to one skilled in the art are intended to be included herein.

We claim:

1. A process for the preparation of odorless acetoglycerides which are solid at room temperature and which have a marked resistance to hydrolysis which comprises acetylating the partial glycerides of fatty acids having 16 to 18 carbon atoms or a mixture thereof with acetic anhydride, said partial glycerides having an iodine number of less than 5 and a monoglyceride content of more than 70% by weight, to a hydroxyl number of up to 30, distilling off the acetic acid and excess acetic anhydride as completely as possible, and deodorizing the reaction product at a temperature of greater than 170° C. under vacuum by passing an inert gas or vapor therethrough.

2. The process of claim 1, wherein the acetylation step is carried out at a temperature of greater than 60° C.

3. The process of claim 1, wherein the acetylation step is carried out at a temperature of about 60° to 150° C.

4. The process of claim 1, wherein the deodorizing step is carried out at a temperature of about 170° to 220° C.

5. The process of claim 1, wherein the inert gas is nitrogen.

6. The process of calim 1, wherein the inert vapor is steam.

7. The process of claim 1, wherein the monoglyceride content is about 90%.

8. The process of claim 1, wherein the partial glycerides are the glycerides of palmitic and stearic acid.

References Cited

UNITED STATES PATENTS

| | | | |
|---|---|---|---|
| 2,091,988 | 9/1937 | Hubbuch et al. | 260—410.8 |
| 2,745,749 | 5/1956 | Feuge et al. | 99—118 |

OTHER REFERENCES

Ward et al.: J. Am. Oil Chemists' Soc., 32, 6, June 1955, p. 316.

Lovegren et al.: Agricultural & Ford Chemistry, 4, 7, July 1956, p. 634.

Alfin-Slater et al.: J. Am. Oil Chemists' Soc., 35, 3, March 1958, p. 122.

LEWIS GOTTS, Primary Examiner

D. G. RIVERS, Assistant Examiner